Jan. 21, 1964 G. F. ROLLO ETAL 3,118,365
CABLE LACING APPARATUS AND METHOD
Filed June 28, 1961
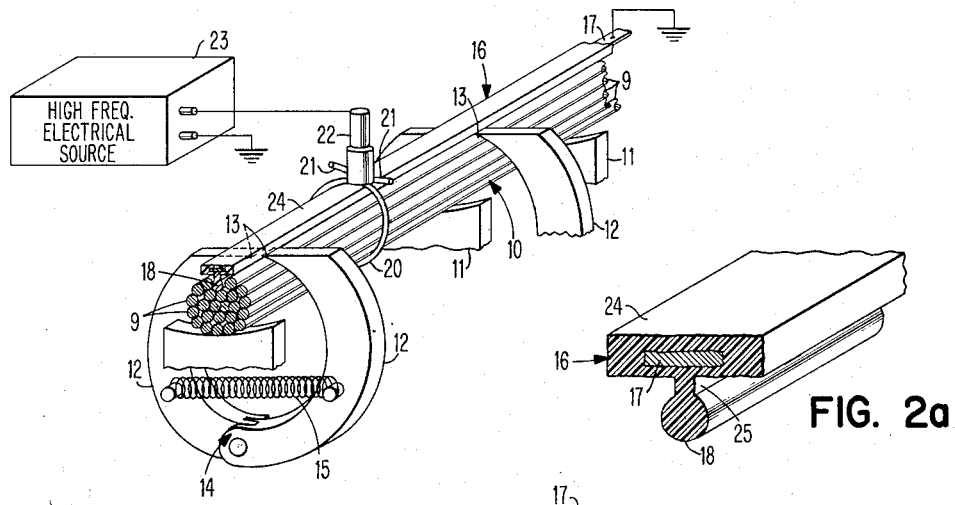
FIG. 1
FIG. 2a
FIG. 2b
FIG. 2c
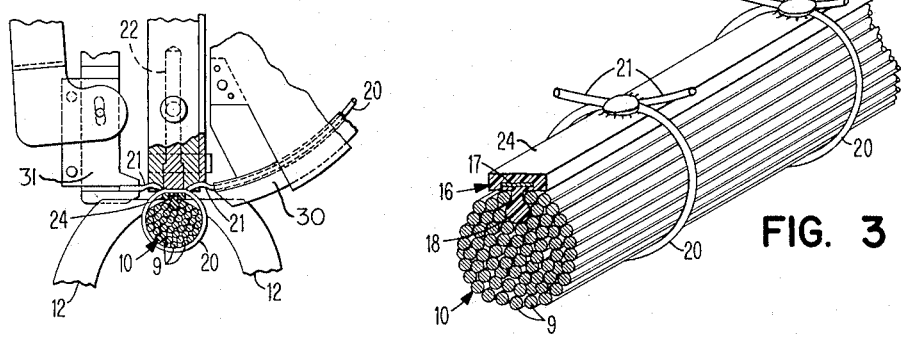
FIG. 4
FIG. 3
INVENTORS
GERALD F. ROLLO
JAMES J. STERANKO
BY
ATTORNEY United States Patent Office 3,118,365
Patented Jan. 21, 1964

3,118,365
CABLE LACING APPARATUS AND METHOD
Gerald F. Rollo, Binghamton, and James J. Steranko, Endwell, N.Y., assignors to International Business Machines Corporation, New York, N.Y., a corporation of New York
Filed June 28, 1961, Ser. No. 120,260
9 Claims. (Cl. 100—3)

This invention relates generally to cabling and, more particularly, to apparatus and a method for joining the ends of a fusible lacing cord about a plurality of elongated elements to form a cable.

A plurality of elongated elements, such as wires, strands, rods or the like are often placed parallel to each other and bound at spaced intervals along their lengths by lacing cords to form a relatively rigid, compact bundle capable of easy handling. Bundles of electrical conductors, commonly known as cables in the electrical art, are especially desirable in a myriad of machines which use, in some part at least, an electrical control system of various electrical components and numerous conductors interconnecting the components. The formation of the loose conductors into cables advantageously promotes compactness and accessibility to components.

Because of the present demand for cables of electrical conductors, automatic or semi-automatic machines have been devised to compress loose insulated conductors into a bundle and secure a lace about the bundle to form an electrical cable. The lace may be knotted about the bundle but it is generally of a thermoplastic material which is heated dielectrically between electrodes at the junction of the two lace ends so that the end portions may be fused together. The electrodes are then moved relative to the compressed bundle so that other laces may be bonded at selected intervals along the plurality of conductors.

Heretofore, the cabling of insulated electrical conductors has been accomplished by drawing the plastic lace tautly about the conductors compressed between pairs of metal jaws and pressing a movable electrode against the junction of lace end portions which was, in turn, pressed against the conductors. A high-frequency voltage supply was applied across the electrode and the jaws to heat the lace junction. The resulting electrical path was through the lace, through the insulation of several of the conductors, along the conductors, and through the insulation of the several conductors to the metal compressing jaws for return to the source. Although this procedure provided satisfactory fusing of the lace, there were several disadvantages inherent in its practical application.

Along the length of a cable, wires leave or enter the bundle to connect between remote electrical components of the system, so that only short increments of cable have a constant number of conductors. Since the quantity of conductors changes, a different number of conductors is available to serve as an electrical path and to support the compression load of the electrode and hence the lace. The result was that a voltage applied for a preset time interval, appropriate for one section of the cable, was inappropriate for a cable section having more or fewer conductors. Even by carefully controlling the applied voltage, arcs would occur between the electrode and conductors or jaws and conductors as the number decreased and thereby burn portions of the conductor insulation to damage the cable. When a section had a greater number of conductors, adjustment had to be made to provide a higher voltage so that lace welding time could be minimized.

A varying quantity of conductors also permitted wide variation in bundle stability when the electrode was pressed against the lace end and compressed bundle so that electrode pressure would vary to produce erratic quality in the fused lace joints. A further disadvantage was the stray arcing which resulted from the relatively long electrical path used. Stray arcs would occur between the electrode or jaws and any remote object if the path to the object was of lower impedance while the electrical potential difference remained the same as that for the welding path.

Accordingly, it is a principal object of this invention to provide an improved apparatus and method for lacing bundles of elongated elements.

Another object of this invention is to provide an improved apparatus and method for lacing bundles of electrical conductors to form a cable.

Another object of this invention is to provide improved apparatus for fusing together the ends of a thermoplastic lace about a bundle of electrical conductors by dielectric heating.

Still another object of this invention is to provide cable lacing apparatus to enable the use of constant welding parameters while using dielectric heating.

Yet another object of this invention is to provide apparatus for producing uniform welds at the ends of fusible lacing cords by dielectric heating.

A still further object of this invention is to provide a method and apparatus for substantially reducing stray arcing experienced while dielectrically heating fusible cable lacing cords.

In accordance with the foregoing objects, this invention provides a tie strip of insulating material having an electrical conductor embedded therein. The tie strip is coextensive with the wires to be cabled and is placed in the compressed bundle of unbound wires adjacent the heating electrode. The electrical source is connected between the electrode and embedded with the conductor serving as the second electrode so that the lacing cord ends may be compressed and heated between the tie strip and electrode. This configuration provides an extremely short electrical heating path, which remains constant for each weld, and eliminates frequent adjustment of welding time and current, reduces the possibility of stray arcs and adds a more rigid support for the external welding electrode to result in welds of uniform quality. The possibility of cable injury is also eliminated because the bound wires no longer serve as welding current conductors and the wires are at a relatively long distance from the electrical path used for using the lacing cord.

This invention has the feature of permanently combining an auxiliary insert with the bound cable wires which can be easily formed by hand to aid in maintaining desired cable configuration as the cable is installed later in a machine.

The foregoing and other objects, features and advantages of the invention will be apparent from the following more particular description of a preferred embodiment of the invention, as illustrated in the accompanying drawings.

In the drawings:

FIGURE 1 is a diagram of a preferred embodiment of cable lacing apparatus including the tie strip of the invention.

FIGURES 2a–2c are perspective views of the tie strip of the invention and modifications thereof.

FIGURE 3 is a perspective view of a bound cable portion showing the welded lacing cords thereon.

FIGURE 4 is an elevation view of a portion of an automatic cabling machine with which the tie strip of the invention may be used.

Referring now to FIGURES 1 and 2, there is shown a plurality of elongated elements 9, such as insulated wires which are to comprise the electric cable 10. The cable wires are loosely laid on supports 11 by forcing them individually between pairs of clamping teeth 12 of any suitable arrangement. For example, a pair of teeth 12 may be assembled with an interleaved hinge which serves as limit stop so that teeth 12 do not contact each other at tips 13, but instead leave a space through which the cable wires may be inserted onto supports 11. A spring 15 secured to each of the teeth is used to maintain the teeth in a closed condition and yet permit the easy removal of a cable after it has been laced by merely lifting the cable from supports 11. The supports are used to permit access to the underside of the cable.

After wires 9 have been inserted between teeth 12, tie strip 16 (FIGURE 2), which has an electrical conductor 17 embedded therein, is wedged between teeth 12 with enlarged depending bead 18 inserted below tooth ends 13. Lace 20 is wrapped and pulled tautly about wires 9 and tie strip 16 to form them into a compact group. Lace end portions 21 are brought in contact with each other on top of the tie strip, and are preferably given at least a half twist about each other to insure good contact between them. With welding electrode 22 pressed downwardly against the entwined lace ends, any suitable well-known high-frequency source of electrical energy 23 is applied between electrode 22 and tie strip conductor 17. The electrical energy is applied only until lace ends 21 have been heated sufficiently to fuse together, forming a permanent bond.

The invention employs dielectric heating for lacing cord 20 and is based on the condenser or capacitor principle, which is well known in the art. The dielectric material to be heated, lace ends 21 and tie strip insulation 24, is placed between a pair of electrode members subjected to a high-frequency voltage. When the electrodes are initially charged, a polarity is established between the electrodes with negatively charged particles being attracted by the positive electrode and the positively charged particles attracted by the negative electrode. The polarity is then reversed by the voltage source so that by rapidly alternating the potential difference on the electrode the charged particle movement back and forth generates heat in the dielectric material between the electrodes.

Referring now to FIGURES 2a–2c, there is shown in more detail tie strip 16. The tie strip comprises an electrical conductor 17 which may be of aluminum, and which is embedded in a thermoplastic material 24 such as vinyl. Thermoplastic material 24 has molded thereto a bead 18 through a narrow strip 25. Bead 18 is provided to hold tie strip 16 in place between sets of teeth 12 prior to the time that lacing cord 20 is welded in place. Conductor 17 is preferably completely embedded in strip portion 24 so that as the high frequency electrical energy is applied between electrode 22 and conductor 17, lace ends 21 will fuse together with each other and with the thermoplastic body 24 of the tie strip. This unitary weld serves to hold lacing cord 20 in position axially along cable 10.

However, various changes may be made in the configuration of tie strip 16 as shown by FIGURES 2b and 2c. In FIGURE 2b, it will be noted that conductor 17 is exposed at its top surface. When this configuration is used in attaching lace 20 about cable 10, the lace ends will be fused to each other but will not be connected to the tie strip so that the lace loop may be moved longitudinally along the cable. FIGURE 2c merely illustrates that bead 18 with its interconnecting portion 25 may be omitted entirely from the tie strip 16. The bead is desirable in that it may be used to hold tie strip 16 in place during the cabling operation with the apparatus as shown. Various other arrangements may be employed, however, in the cabling apparatus so that the bead is undesirable or unnecessary. Only a few of the various possible configurations of the tie strip have been shown in these figures. For instance, only a conductor 17 is necessary if purely non-conductive elements are to be bound and the lace is not to be fixed longitudinally along the bundle.

The end of electrode 22 in contact with lace 20 may be of any suitable configuration but should be approximately the same as or less than the width of tie strip 16 so that the edges of electrode 22 do not extend beyond the transverse dimension of the tie strip. By maintaining the dimension of electrode 22 less than the width of the rectangular portion 24, the likelihood of stray arcs from the end of the electrode to wires 9 is substantially reduced. The extension of the tie strip beyond the edges of the electrode creates a longer path and a higher impedance for the stray arcs, and avoids injury to the wires of the cable. By using conductor 17 as one of the electrodes for dielectrically heating lacing cord 20, the shortest possible electrical path is established across lacing cord end which permits the use of constant electrical and time parameters for welding successive lacing cords even though the number of conductors in the cable may vary.

In FIGURE 3 there is shown a portion of a completed cable 10 composed of wires 9 and tie strip 16. This figure illustrates the appearance of the fused lace ends after welding. It also shows the weld produced between the lace and tie strip insulation 24. It is seen that tie strip 16 becomes an integral part of cable 10 and may be deformed along with the cable wires to aid in holding the cable in the desired configuration when installed subsequently in a machine. The presence of tie strip 16 is especially beneficial when the cable 10 comprises only a few wires, for example, three or four wires.

There is shown in FIGURE 4 a portion of an automatic cable lacing machine disclosed in a similarly assigned co-pending application serial No. 806,175, filed April 13, 1959, now U.S. Patent No. 3,033,102, with which this tie strip may be used. The automatic machine comprises a needle 30 which feeds a supply of lace 20 to a gripper 31 underneath wires 9. Needle 30 and gripper 31 are then raised and rotated by mechanism not shown to entwine and tighten the lace ends about loose wires 9 and tie strip 16. Electrode 22 is then lowered on the lace knot and a high-frequency voltage is applied between tie strip conductor 17 and electrode 22 to fuse the lace ends and tie strip together.

While the invention has been particularly shown and described with reference to a preferred embodiment thereof, it will be understood by those skilled in the art that the foregoing and other changes in form and details may be made therein without departing from the spirit and scope of the invention.

We claim:

1. Apparatus for joining the ends of a thermoplastic lacing cord about a plurality of elements, comprising:
   a thermoplastic tie strip located between said elements and the end portions of said lacing cord, said tie strip containing an electrical conductor;
   an electrode for compressing said lacing cord ends against said tie strip;
   and means for producing an electric field across said electrode and said conductor for dielectrically heating said ends and said tie strip whereby said ends and said tie strip are fused together so that said elements are bound together with said tie strip to form a unitary bundle.

2. Apparatus for binding a plurality of elements, comprising:
   a fusible tie strip containing an electrical conductor integral therewith;
   a fusible lacing cord encompassing said elements and said tie strip such that said tie strip is located between said lacing cord and said elements for binding said elements and said tie strip in a unitary bundle;
   an electrode associated with said tie strip and said lacing cord;
   and means for applying a high frequency voltage between said conductor and said electrode for dielectrically heating and fusing said lacing cord and said tie strip together in a permanent bond.

3. Apparatus for binding a plurality of elements as a bundle, comprising:
   an elongated thermoplastic tie strip having an electrical conductor embedded therein;
   a thermoplastic lacing cord for encompassing said tie strip and said elements as a bundle, and having the end portions of said cord juxtaposed adjacent said tie strip such that said tie strip is located between said end portions and said elements;
   an electrode for compressing said cord ends against said tie strip;
   and means for establishing an electric field across said conductor and said electrode for dielectrically heating said cord ends and said tie strip, whereby said ends become bonded to each other and to said tie strip to permanently bind said elements.

4. Apparatus as described in claim 3 wherein the portion of said electrode adjacent said cord ends is of such size as to be within the transverse dimension of said tie strip.

5. The method of bonding a lacing cord about a plurality of elements, comprising the steps of:
   forming said elements as a bundle;
   placing an electrically conductive tie strip on the elements of said bundle;
   encompassing said bundle and said tie strip with a fusible lacing cord so that the end portions of said lacing cord are juxtaposed adjacent said tie strip;
   compressing said end portions of said lacing cord against said tie strip with an electrode;
   and applying a high frequency voltage between said tie strip and said electrode to thereby pass a current through the electrode, the end portions of said lacing cord, returning through said tie strip, to thereby cause said end portions of said lacing cord adjacent said tie strip to become fused together.

6. The method of bonding a lacing cord about a plurality of elongated elements to bind said elements in a bundle comprising the steps of:
   compressing said elements to form a bundle;
   placing an insulated electrical conductor on the elements of said bundle;
   encompassing said bundle and said conductor with a fusible lacing cord so that the ends of said lace are juxtaposed adjacent said conductor;
   compressing said lace ends against the insulation of said conductor with an electrode;
   and applying a high frequency voltage between said electrical conductor and said electrode to thereby pass a current through the electrode, the end portions of said lacing cord, returning through said electrical conductor, to thereby cause said end portions of said lacing cord adjacent said electrical conductor to become fused together.

7. A method for securing a plurality of elongated elements in a bundle, comprising the steps of:
   forming said elements as a bundle;
   laying a thermoplastically enclosed electrical conductor on said formed elements;
   encompassing said bundle and said insulated conductor with a thermoplastic lacing cord such that the ends of said cord are juxtaposed adjacent said conductor;
   compressing said lace ends against said insulated conductor with an electrode;
   and applying an alternating electric field between said electrode and said conductor to dielectrically heat and bond said ends to each other and to said insulation.

8. The method of bonding a thermoplastic lace about a plurality of elements to bind said elements in a bundle, comprising the steps of:
   placing a thermoplastic tie strip on said elements, said tie strip having an electrical conductor embedded therein;
   encompassing said elements and said tie strip tautly with a lacing cord to form a bundle so that the ends of said lacing cord are juxtaposed adjacent said tie strip;
   bringing an electrode into proximity with said ends and said tie strip;
   and applying a high frequency voltage between the electrical conductor embedded in said tie strip and said electrode to dielectrically heat said lace ends until said lace ends are fused together and fused to said tie strip.

9. A method for securing a plurality of elongated elements as a bundle, comprising the steps of:
   laying a tie strip comprised of a thermoplastically insulated electrical conductor longitudinally on said plurality of elements;
   drawing a thermoplastic lacing cord tautly about said elements on said tie strip to form a bundle with said tie strip peripherally located on said bundle and with said lacing cord entwined about itself at said strip;
   compressing said entwined portions of said lacing cord against said tie strip insulation with an electrode;
   and applying an electric field between said tie strip conductor and said electrode to dielectrically heat said lacing cord at said self-contacting areas until said lacing cord is bonded to itself and to said insulation.

References Cited in the file of this patent
UNITED STATES PATENTS

| 2,429,635 | Maddock | Oct. 28, 1947 |
| 2,638,963 | Frederick et al. | May 19, 1953 |
| 2,881,577 | McLaren | Apr. 14, 1959 |
| 3,033,102 | Fryklund | May 8, 1962 |